United States Patent [19]

Sato

[11] Patent Number: 5,452,329
[45] Date of Patent: Sep. 19, 1995

[54] MODEM DEVICE

[75] Inventor: Tetsuo Sato, Ota, Japan

[73] Assignee: Sanyo Electric Co., Ltd., Osaka, Japan

[21] Appl. No.: 291,140

[22] Filed: Aug. 16, 1994

Related U.S. Application Data

[63] Continuation of Ser. No. 967,793, Oct. 28, 1992, abandoned.

[30] Foreign Application Priority Data

Oct. 31, 1991 [JP] Japan .................. 3-286541

[51] Int. Cl.⁶ .............................................. H04B 1/00
[52] U.S. Cl. ........................ 375/222; 375/220; 375/377; 370/16; 340/825.03; 340/825.15; 340/825.51
[58] Field of Search ............... 375/219, 220, 222, 377; 379/93–94; 370/16, 24, 31–32, 85.2, 85.6, 110.1; 340/825.03, 825.06, 825.5, 825.15, 825.51

[56] References Cited

U.S. PATENT DOCUMENTS

| | | | |
|---|---|---|---|
| 3,633,168 | 1/1972 | Dixon et al. | 340/825.1 |
| 4,040,014 | 8/1977 | Gehrling | 340/825.5 |
| 4,045,774 | 8/1977 | Morrison | 340/825.5 |
| 4,775,983 | 10/1988 | Larimer | 375/377 |
| 4,782,498 | 11/1988 | Copeland, III | 375/222 X |
| 5,095,494 | 3/1992 | Takahashi et al. | 375/377 |
| 5,128,666 | 7/1992 | Munier et al. | 340/825.06 |

FOREIGN PATENT DOCUMENTS

| | | |
|---|---|---|
| 0111114 | 6/1984 | European Pat. Off. . |
| 0167351 | 1/1986 | European Pat. Off. . |
| 1149666 | 6/1989 | Japan . |
| 2187609 | 9/1987 | United Kingdom . |

OTHER PUBLICATIONS

European Search Report, Jun. 27, 1994, application Ser. No. 92 11 8457.

M. Culier, et al., "Serial Interface Between a Modem and a Data Multiplexing Box", IBM Technical Disclosure Bulletin, vol. 27, No. 9, Feb. 1985, pp. 5270–5271.

*Primary Examiner*—Young Tse
*Attorney, Agent, or Firm*—Spensley Horn Jubas & Lubitz

[57] ABSTRACT

A modem device enabling a single communication line to be shared by a plurality of terminal units, and needing no switching operation between the terminal units on transmission. In transmission, when a transmission-start request is supplied from a terminal unit of any channel, the state of the other channels are checked. If these other channels are all in idle state, a channel selecting signal for selecting the channel corresponding to the transmission-start request is turned on so as to couple the corresponding terminal unit to a modem section for starting the transmission. In reception, on the other hand, upon receiving a call, priority calling channel information having been set in a predetermined mode register is read out to turn on a channel selecting signal for selecting the channel indicated by that information. As a result, a terminal unit of the channel corresponding to the channel selecting signal is selected to enable the receiving operation.

6 Claims, 6 Drawing Sheets

MODEM DEVICE

This is a continuation of application Ser. No. 07/967,793 filed on Oct. 28, 1992, now abandoned.

BACKGROUND OF THE INVENTION

1. Field of the Invention

This invention relates to a communication device, and more particularly to a modem device for enabling a single communication line to be shared by a plurality of terminal, or external device, units.

2. Description of the Related Art

A modem, acronym derived from modulator-demodulator, is used to convert signals output from one type of equipment into a form suitable for input to another type. The modem is composed of a modulator for superimposing a data signal on a carrier wave according to a predetermined method, and a demodulator for receiving a modulated carrier wave and recreating the signal originally transmitted by removing the carrier wave.

Such a modem is usually connected between a respective terminal unit of a personal computer or the like and a communication line. Therefore, a plurality of modems corresponding to the number as of the terminal units are required when a plurality of terminal units are used in a single office or home, thereby increasing the installation cost.

A method for solving this problem is to share a single modem between a plurality of terminal units. In this method, the terminal units are connected to the single modem through a manual switch device, and the modem can be commonly accessed by switching the connection by manually operating the switch device.

However, in the above-mentioned conventional modem device, the switching operation between the terminal units was troublesome because it had to be manually carried out. If the terminal units are distantly spaced from each other, locating the switch device near any one terminal unit means that it becomes remote from the others, presenting a serious inconvenience to the users of the other terminal units when needing to carry out the switching operation. Although an alternative method by remotely controlling the switching operation is proposed, the main problem, that the switching must be manually operated, Is unchanged in any case.

SUMMARY OF THE INVENTION

It is therefore an object of this invention to provide a modem device which is capable of being shared by a plurality of terminal units without requiring any particular manual switching operation on starting transmission.

A first modem device according to the present invention comprises a modulator/demodulator for modulating/demodulating transmission/reception signals, a selecting signal output means for monitoring input from said plurality of channels, and outputting a channel selecting signal for selecting a channel through which a communication-start requesting signal which has been input first, and a switch means for switching the connection between a terminal coupled to a corresponding channel and said modulator/demodulator in response to the channel selecting signal supplied from said selecting signal output means.

A second modem device according to the present invention comprises a modulator/demodulator means for modulating/demodulating transmission/reception signals, a memory means for storing priority channel data for determining which of said plurality of channels should be a priority calling channel, a selecting signal output means for reading out the priority channel data stored in said memory means when a calling indication from a communication line is supplied, and outputting a channel selecting signal for selecting a corresponding channel, and a switch means for switching the connection between a terminal coupled to a corresponding channel and said modulator/demodulator in response to the channel selecting signal supplied from said selecting signal output means.

According to the modem device of the present invention, the terminal which initially requests the communication-start from among the terminals connected to the plural input channels is preferentially selected to be coupled to the modulator/demodulator, thereby setting up a communication stand-by condition.

According to the modem device of the present invention, further, the priority calling channel is selected in accordance with the data stored in the memory means when calling is supplied via the communication line from the opposite station, and the terminal coupled to the selected channel is connected to the modulator/demodulator, thereby setting up a communication stand-by condition.

The above and other advantages, features and additional objects of this invention will be manifest to those versed in the art upon making reference to the following detailed description and the accompanying drawings in which a structural embodiment Incorporating the principles of this invention is shown by way of illustrative example.

DETAILED DESCRIPTION

Figure 1:
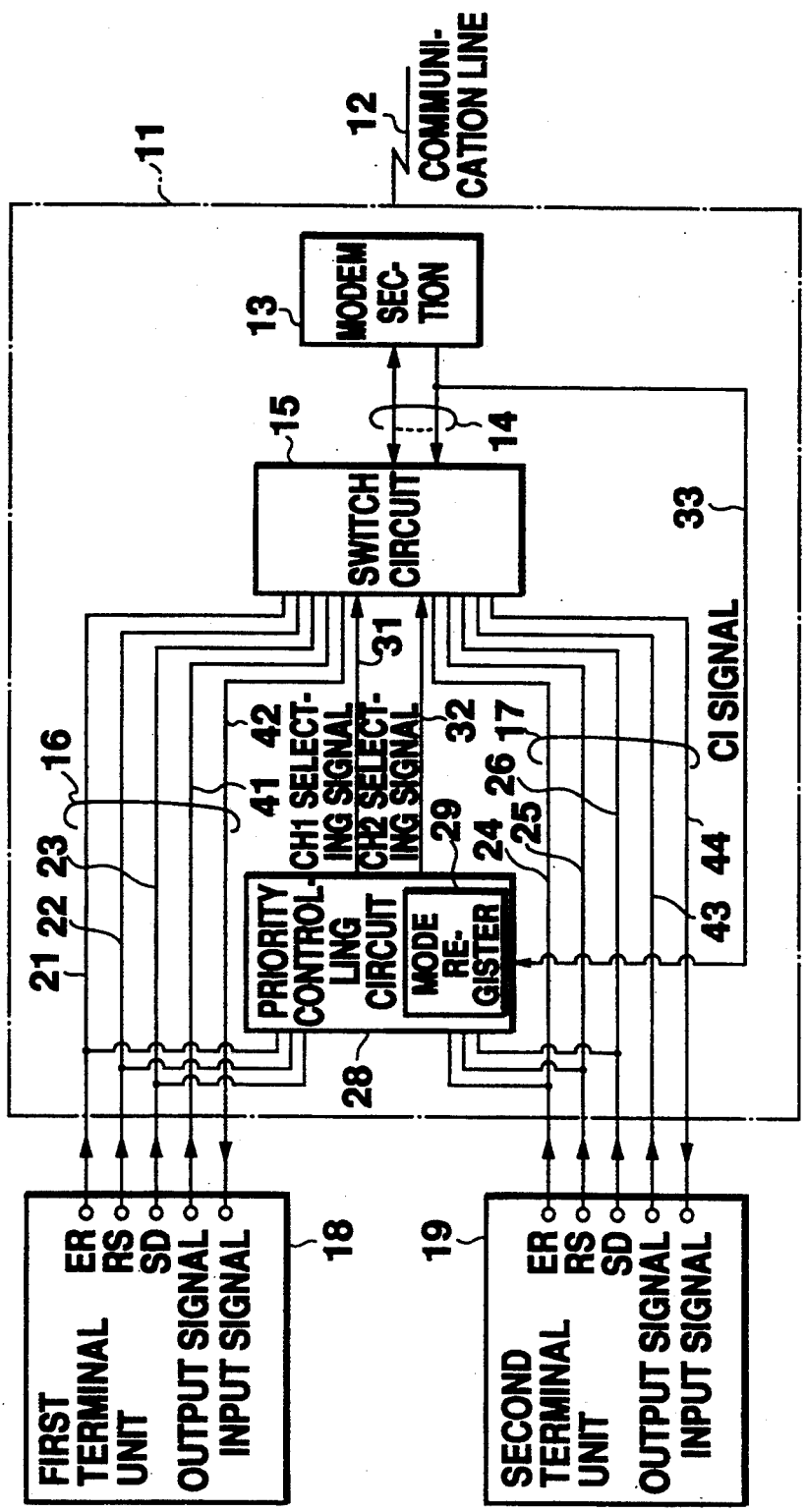
FIG. 1 is a block diagram showing a modem device according to an embodiment of the present invention.

FIG. 1 shows essential parts of a modem device according to the present invention and its periphery devices. In FIG. 1, a modem device 11 includes a modem section 13 connected to a switch circuit 15 through an RS232C signal line group 14 for performing modulation/demodulation of the signals supplied/received to/from the communication line 12. The switch circuit 15 has two input channels which are coupled to a first terminal unit 18 and a second terminal unit 19 via RS232C signal line groups 16 and 17 respectively.

The RS232C signal line group 16 is composed to be capable of transmitting 25 signals, among which three lines consisting of an ER (Equipment Ready) signal 21, an RS (Request to Send) signal 22, and a SD (Send Data) signal 23 are respectively branched therefrom to be input to the priority controlling circuit 28. Likewise, three lines consisting of an ER signal 24, an RS signal 25, and a SD signal 26 of the RS232C signal line group 17 are respectively branched therefrom to be input to the priority controlling circuit 28. The ER signal is to indicate whether or not the terminal unit is ready to receive signals. The RS signal is to request transmission from the terminal unit to the modem, and the modem supplies a carrier wave to the opposite station when the RS signal is in an ON-state. The SD signal is the actual serial data to be supplied from the terminal unit to the modem.

Figure 3:
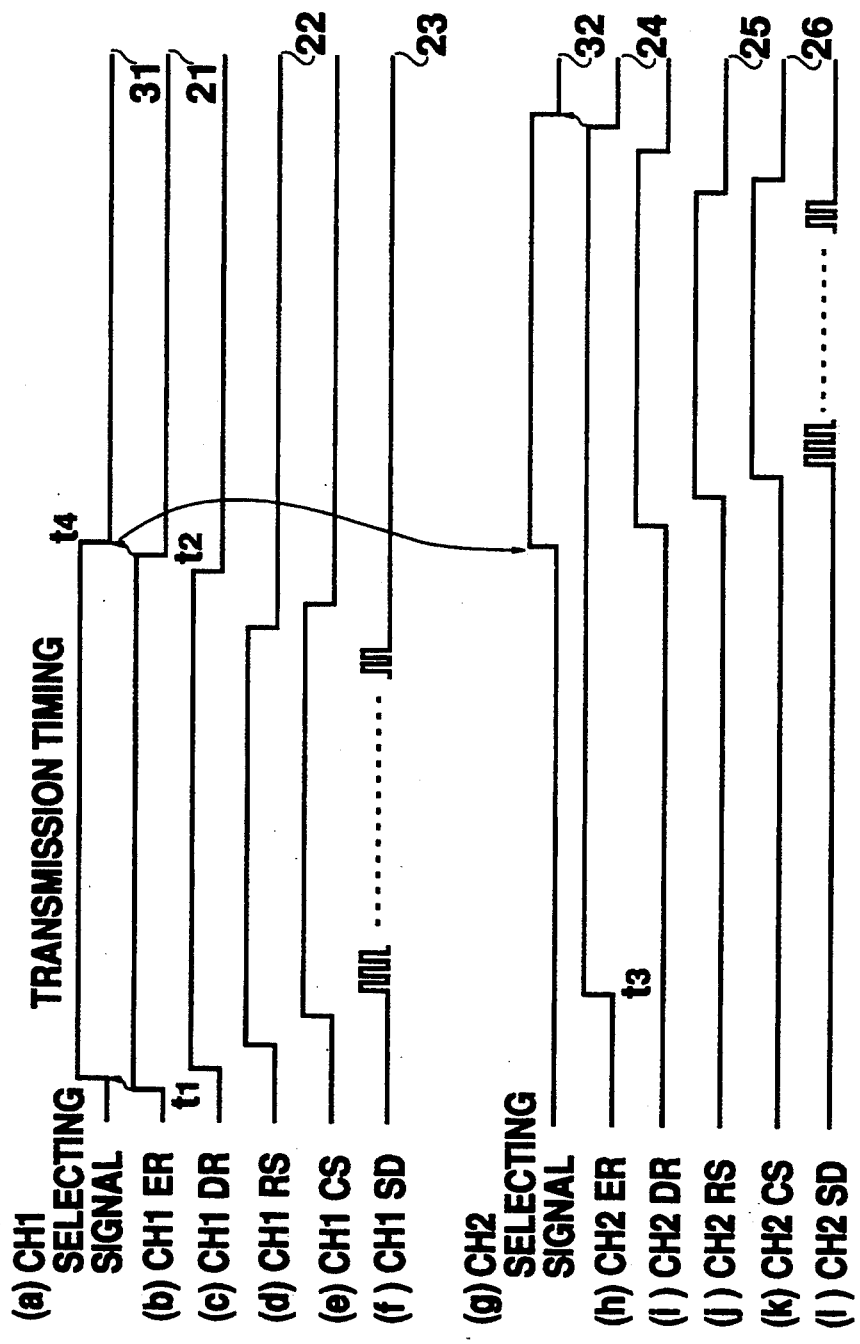
FIG. 3 is a timing diagram showing in more detail the operation when the modem device itself starts calling for transmission.
Figure 6:
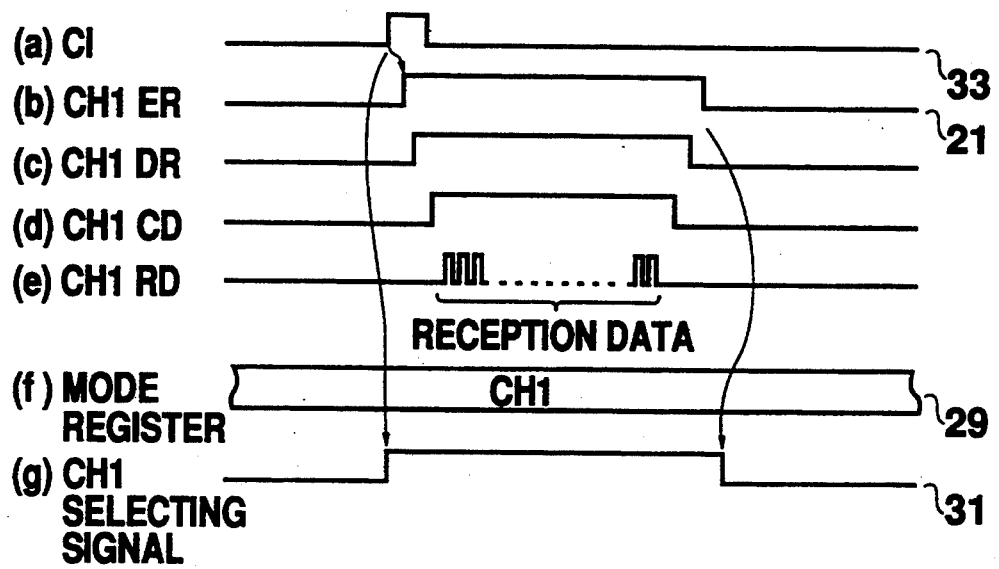
FIG. 6 is a timing diagram showing in more detail the operation when the modem device is called from the opposite station for transmission.

As input signals 42 and 44 in the RS232C signal line groups 16 and 17, there are included an RD (Receive Data) signal being reception data, a CD (Carrier Detect) signal indicating that the carrier wave signal from the opposite station is being received, and a CS (Clear to Send) signal indicating that the carrier wave signal, etc are being transmitted. The RD and CD signals are shown in FIG. 6 and the CS signal is shown in FIG. 3. As output signals 41 and 43, data signal, transmit speed selecting signal etc. are included.

The priority controlling circuit 28 comprises a mode register 29 for storing priority channel data representing the channel to be preferentially selected when called, as will be mentioned later. The priority controlling circuit 28 outputs a selecting signal 31 for selecting a "channel 1" (hereinafter referred to as CH1 selecting signal), and a selecting signal 32 for selecting a "channel 2" (hereinafter referred to as CH2 selecting signal), which are input to the switch circuit 15. The switch circuit 15 operates to connect whichever one of the two channel selecting signals 31, 32 is at the "H" level to the modem section 13.

Among the signals in the RS232C signal line group 14 between the modem section 13 and the switch circuit 15, CI (Calling Indicator) signal 33 is branched therefrom to be input to the priority controlling circuit 28.

The operation of such a modem device composed as described above will now be described. In this embodiment, both cases, of making a call from the first terminal 18 or the second terminal 19 to the opposite station and of receiving a call from the opposite station will be separately explained.

When Making a Call from the First Terminal 18 or the Second Terminal 19

Figure 2:
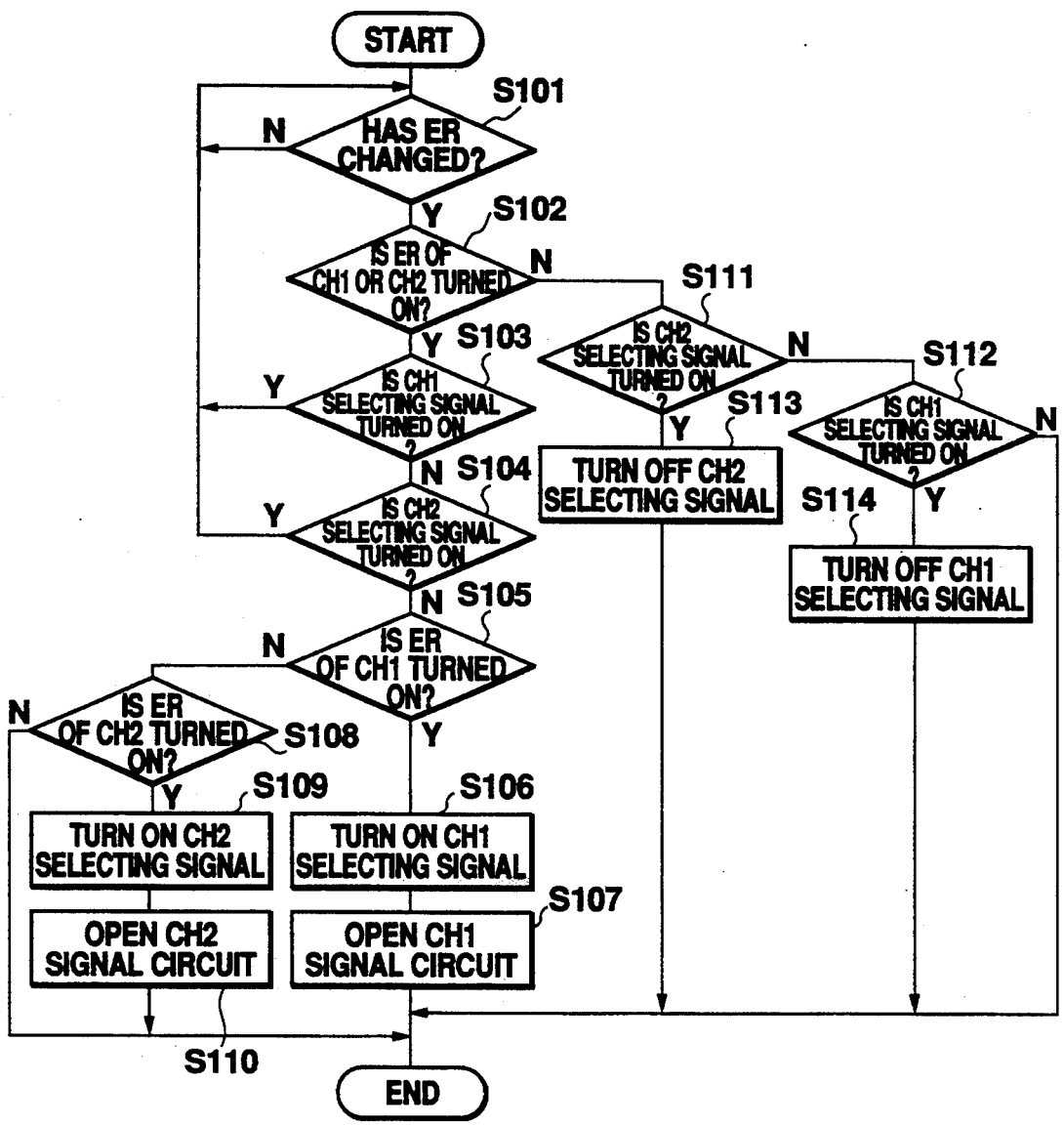
FIG. 2 is a flow diagram showing the operation when the modem device itself starts calling for transmission.

The case when a call is made from the modem device 11 side to the opposite station will be described below with reference to FIG. 2.

The priority controlling circuit 28 monitors the ER signals 21, 24 from the first and the second terminal units 18, 19 (Step S101), and when it detects that either one of the ER signals is turned on (Step S101; Y, Step S102; Y), checks the on-off state of the CH1 selecting signal 31 and the CH2 selecting signal 32. If either one of these selecting signals is in on-state (Step S103; Y, or Step S104; Y), it judges that the terminal unit of that channel side is under communication so as to continue to monitor the ER signals 21, 24 (Step S101).

If both the CH1 selecting signal 31 and the CH2 selecting signal 32 are In the off-state (Step S103; N, Step S104; N), it checks again the ER signals 21, 24 of both channels. If the ER signal 21 is in the on-state (Step S105; Y), the priority controlling circuit 28 turns the CH1 selecting signal 31 to the on-state (Step S106). As a result, the RS232C signal line groups 16 and 14 are mutually coupled in the switch circuit 15, and the first terminal unit 18 is connected to the modem section 13 (Step S107). Subsequently, in accordance with a predetermined sequence, the first terminal 18 becomes able to communicate with the opposite station via the communication line 12.

Alternatively, if the ER signal 24 is in the on-state (Step S105; N, Step S108; Y), the priority controlling circuit 28 turns the CH2 selecting signal 32 to the on-state (Step S109). In consequence, both RS232C signal line groups 17 and 14 are mutually coupled in the switch circuit 15, and the second terminal 19 is connected to the modem section 13 (Step S110). Subsequently, in accordance with a predetermined sequence, the second terminal 19 becomes able to communicate with the opposite station via the communication line 12.

On the other hand, in Step S102, if both ER signals 21, 24 are in the off-state (Step S102; N), the priority controlling circuit 28 checks the state of the CH1 selecting signal 31 and the CH2 selecting signal 32 (Step S111, S112). As a result, if the CH2 selecting signal 32 is in the on-state (Step S111; Y), the CH2 selecting signal 32 is turned off (Step S113) and the CH1 selecting signal 31 (Step S114) is turned off if the CH1 selecting signal 31 is in the on-state (Step S111; N, Step S112; Y).

The above-mentioned operation will now be explained in more detail with reference to FIG. 3. As shown in FIG. 3, firstly, shortly after the ER signal 21 from the first terminal unit 18 as turned on at t1 (FIG. 3 (b)), the CH1 selecting signal 31 turns on (FIG. 3 (a)), and the first terminal 18 of the "channel 1" is connected to the modem section 13 as mentioned earlier. The modem section 13 turns on the DR signal and supplies this to the first terminal unit 18 (FIG. 3 (c)). In response thereto, the first terminal 18 turns on the RS signal and supplies this to the modem section 13 (FIG. 3 (d)). The modem section 13, upon receiving the RS signal 22, turns the CS signal on (FIG. 3 (e)), and informs the first terminal unit 18 of the data transmission-ready state. Then the first terminal unit 18 supplies the SD signal 23 i.e. transmission data (FIG. 3 (f)). The transmission data undergoes a predetermined modulation in the modem section 13, and is output to the communication line 12.

Upon terminating the transmission of the SD signal 23, the first terminal unit 18 turns the RS signal off. As a result, the modem section 13 turns the CS signal off, and further turns the DR signal off. In response to this, the first terminal unit 18 turns the ER signal 21 off at t2. The priority controlling circuit 28 detects the off-state of the ER signal 21 and turns the CH1 selecting signal off at t4.

Thus, a series of transmitting operations by the first terminal unit 18 at the "channel 13[ side terminates.

When the CH1 selecting signal 31 is in the on-state, if the second terminal unit 19 at the "channel 2" side turns the ER signal 24 on at e.g. t3 (FIG. 3 (h)), the CH2 selecting signal does not immediately turn on since the CH1 selecting signal is already in the on-state, as mentioned earlier. In such a case, there is a wait until the time t4 (FIG. 3 (a)) when the CH1 selecting signal turns off, and then the CH2 selecting signal 32 turns on. The operations after the turning on of the CH2 selecting signal 32 are the same as those of aforementioned "channel 1" case, so the communication is carried out in a sequence as shown in FIG. 3 (g)–(l).

When Receiving a Call from the Opposite Station

The operations when a call from the opposite station is received will now be described with reference to FIG. 4. In this case, it is first necessary to set a priority calling channel in the priority controlling circuit 28 prior to any reception. The signal timing relating to the setting of the priority calling channel is shown in FIG. 5. In a waiting state i.e. the CI signal from the communication line 12 is in the off-state (FIG. 4, Step S101; N), if the first terminal unit 18, for example, turns the RS signal 22 (FIG. 5 (*b*)) on (FIG. 4, Step S102; Y) with the ER signal 21 (FIG. 5 (*a*)) remaining in the off-state, the priority controlling circuit 28 recognizes this state as a request for setting a priority channel so as to set the CH1 mode setting data 35 supplied from the first terminal unit 18 in the form of the SD signal 23 (FIG. 5 (*c*)) in the mode register 29 (FIG. 4, Step S103, FIG. 5 (*g*)). These data are priority channel data indicating that the "channel 1" will be automatically and preferentially selected when a call is received.

In the same manner, if the RS signal 25 (FIG. 5 (*e*)) is turned on with the ER signal 24 (FIG. 5 (*d*)) remaining in the off-state, the priority controlling circuit 28 will set the CH2 mode setting data 36 supplied from the second terminal unit 19 in the form of the SD signal 26 (FIG. 5 (*f*)) in the mode register 29 (FIG. 5 (*g*)).

Figure 4:
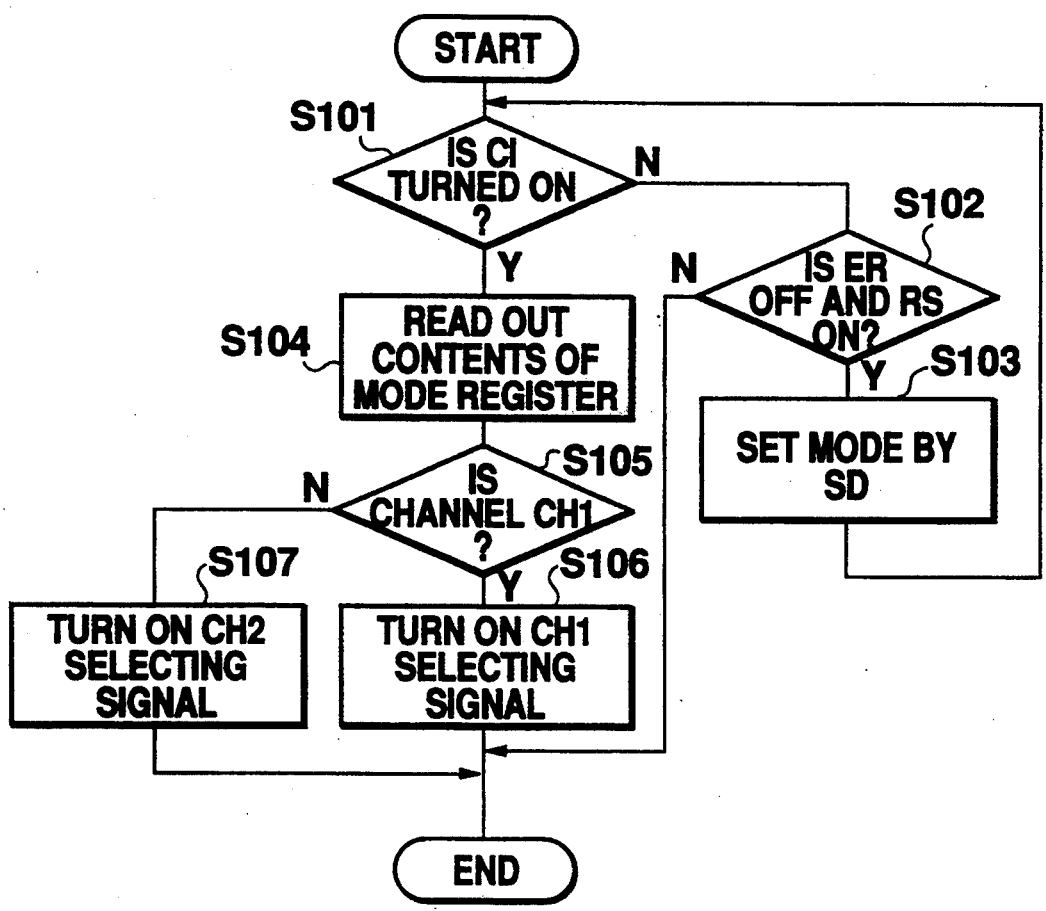
FIG. 4 is a flow diagram showing the operation when the modem device is called for transmission.
Figure 5:
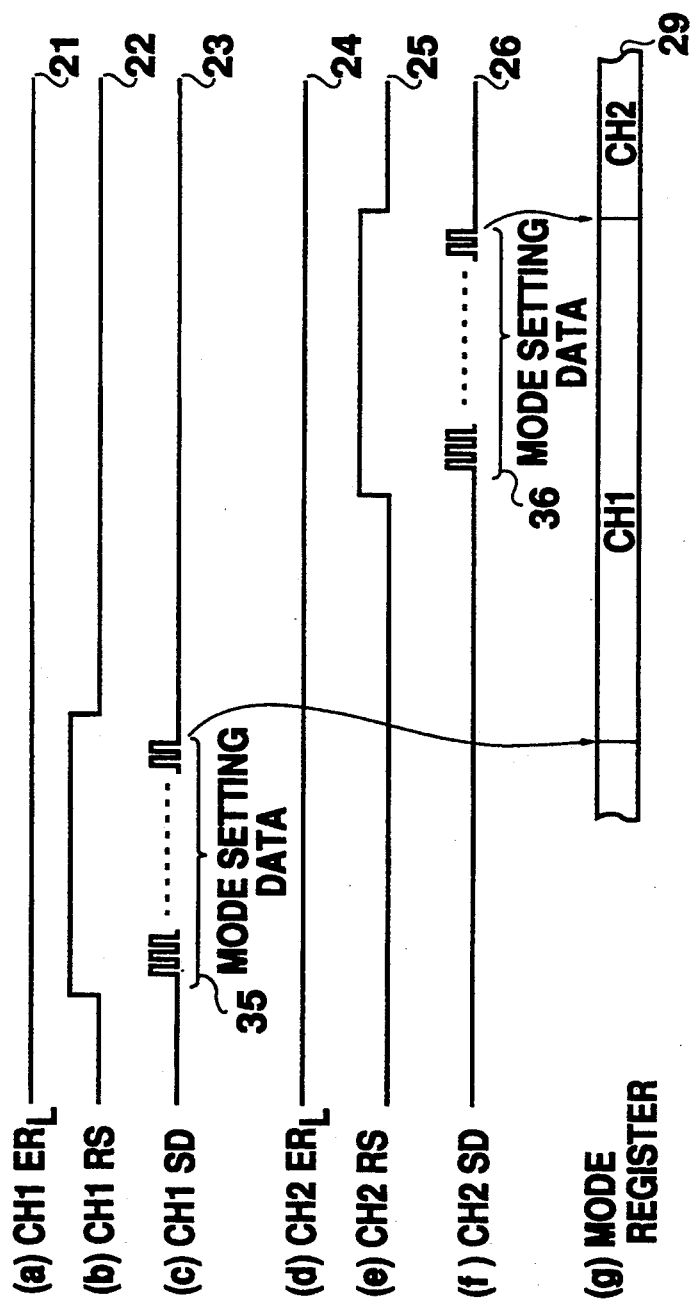
FIG. 5 is a timing diagram showing the operation when a priority calling channel is established in the modem device.

In FIG. 4, when the CI signal 33 (FIG. 1) is turned on by the call from the opposite station (Step S101; Y), the priority controlling circuit 28 reads out the contents of the mode register 29 (Step S104), and discriminates the priority calling channel. If the priority calling channel is "channel 1" (Step S105; Y), the priority controlling circuit 28 turns the CH1 selecting signal 31 on (Step S106), while the CH2 selecting signal 32 is turned on (Step S107) if it is "channel 2" (Step S105; N). Thus, the terminal unit of the channel at the selecting signal on-side is coupled to the modem section 13, and the communication with the opposite station will start in accordance with a predetermined sequence.

The above-mentioned operations will now be described in more detail with reference to FIG. 6. In this case, it is assumed that the "channel 1" is set as the priority calling channel.

Firstly, when the CI signal 33 (FIG. 6 (*a*)) is input through the modem section 13, the priority controlling circuit 28 reads out the contents of the mode register 29 (FIG. 6 (*f*)) and turns the CH1 selecting signal 31 (FIG. 6 (*g*)) on as mentioned earlier. In consequence, the "channel 1" is selected, and the first terminal unit 18 turns the ER signal 21 (FIG. 6 (*b*)) on.

Then, the modem section 13 turns the DR signal (FIG. 6 (*c*)) on to inform that the communication line 12 is coupled to the modem section 13, and turns the CD signal (FIG. 6 (*d*)) on. As a result, the RD signal (FIG. 6 (*e*)) from the opposite station is received, and thereafter the ER signal 21 as well as the CH1 selecting signal 31 are turned off.

Thus, according to this embodiment, when making a call the earliest call-requested terminal unit among a plurality of terminal units is preferentially selected, while on receiving the call the terminal unit at the side of the priority calling channel previously set in the mode register becomes available.

Although the above-mentioned description of the present embodiment is related to a modem device having two input channels, the present invention can of course be applied to those having more than two input channels.

As mentioned above, according to an embodiment of the present invention, since the earliest terminal to request the communication-start among a plurality of terminal units coupled to a plurality of input channels is preferentially selected to be the modulator/demodulator, there will be no need for any particular manual operation for starting the communication. Accordingly, the operator can perform the communication without feeling that a single modem device is shared by a plurality of terminal units.

Further, according to another embodiment of the present invention, since a priority calling channel is previously set such that a corresponding terminal unit connected to the priority calling channel is coupled to the modulator/demodulator, a single modem device is also advantageously shared in the case of receiving the call by a plurality of terminal units.

What is claimed is:

1. A modem device having a plurality of channels, each channel being connected to only one respective terminal which is external to said modem device, and each terminal being operative to issue to its respective channel a communication-start requesting signal, said modem device comprising:
    a modulator/demodulator for modulating-/demodulating transmission/reception signals;
    a selecting signal output means for monitoring communication-start requesting signals input from said plurality of channels, and outputting a channel selecting signal for selecting a channel through which one of the communication-start requesting signals has been input first; and
    a switch means connected to all of said channels for establishing a connection between the terminal coupled to the channel selected by said selecting signal output means and said modulator/demodulator in response to the channel selecting signal supplied from said selecting signal output means, wherein said selecting signal output means, when one of the communication-start requesting signals from another channel is input while any of said plurality of channels is selected and in use, outputs a corresponding channel selecting signal for selecting said another channel after the use of the channel is terminated.

2. A modem device having a plurality of channels, each channel being connected to only one respective terminal which is external to said modem device, and each terminal being operative to issue to its respective channel a communication-start requesting signal, said modem device comprising:
    a modulator/demodulator for modulating-/demodulating transmission/reception signals;
    a selecting signal output means for monitoring communication-start requesting signals input from said plurality of channels, and outputting a channel selecting signal for selecting a channel through which one of the communication-start requesting signals has been input first; and
    a switch means connected to all of said channels for establishing a connection between the terminal coupled to the channel selected by said selecting signal output means and said modulator/demodulator in response to the channel selecting signal supplied from said selecting signal output means, wherein said selecting signal output means cancels the output of a corresponding channel selecting signal when said communication-start requesting signal is canceled.

3. A modem device having a plurality of channels, each channel being connected to only one respective terminal which is external to said modem device, said modem device comprising:
a modulator/demodulator for modulating/demodulating transmission/reception signals;
a memory means for storing priority channel data for determining which of said plurality of channels should be a priority calling channel;
a selecting signal output means for reading out the priority channel data stored in said memory means when a calling indication from a communication line is supplied, and outputting a channel selecting signal for selecting a corresponding channel; and
a switch means connected to all of said channels for establishing a connection between the terminal coupled to the corresponding channel and said modulator/demodulator in response to the channel selecting signal supplied from said selecting signal output means.

4. A modem device according to claim 3, wherein said selecting signal output means is operative for setting the priority channel data in said memory means.

5. A modem device according to claim 4, wherein said selecting signal output means performs the setting operation when a predetermined request-to send signal is input under such a condition that neither the calling indication from the communication line nor an equipment-ready signal is supplied.

6. A modem device according to claim 3 wherein: each terminal is operative to issue to its respective channel a communication-start requesting signal; said selecting signal output means is further operative for monitoring communication-start requesting signals input from said plurality of channels, and outputting the channel selecting signal for selecting a channel through which one of the communication-start requesting signals has been input first; and said switch means is further operative for establishing the connection between the terminal coupled to the channel selected by said selecting signal output means and said modulator/demodulator in response to the channel selecting signal supplied from said selecting signal output means.

* * * * *